(12) United States Patent
Arai (10) Patent No.: US 11,341,604 B2
(45) Date of Patent: May 24, 2022

(54) PROCESSING DEVICE FOR OBJECT IDENTIFICATION (71) Applicant: KOITO MANUFACTURING CO., LTD., Tokyo (JP)

(72) Inventor: Kensuke Arai, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/061,914

(22) Filed: Oct. 2, 2020

(65) Prior Publication Data

US 2021/0019860 A1 Jan. 21, 2021

Related U.S. Application Data (63) Continuation of application No. PCT/JP2019/014889, filed on Apr. 3, 2019.

(30) Foreign Application Priority Data

Apr. 5, 2018 (JP) .............. JP2018-073353

(51) Int. Cl.
*G06T 3/00* (2006.01)
*G06T 3/40* (2006.01)
*G06V 20/58* (2022.01)
*G06N 3/08* (2006.01)

(52) U.S. Cl.
CPC ............. *G06T 3/0031* (2013.01); *G06T 3/40* (2013.01); *G06V 20/58* (2022.01); *G06N 3/08* (2013.01)

(58) Field of Classification Search
CPC ..... G06T 3/0031; G06T 3/40; G06K 9/00805; G06N 3/08
See application file for complete search history.

(56) References Cited

U.S. PATENT DOCUMENTS

2013/0076240 A1 3/2013 Endo et al.
2017/0075356 A1 3/2017 Delp

FOREIGN PATENT DOCUMENTS

| CA | 2975139 A1 * | 3/2018 | ............ G08G 5/045 |
|---|---|---|---|
| CN | 204978398 U | 1/2016 | |
| CN | 107180409 A * | 9/2017 | |
| CN | 206690990 U | 12/2017 | |
| DE | 102015007172 A1 | 2/2016 | |
| JP | 2004-362469 A | 12/2004 | |
| JP | 2009-516278 A | 4/2009 | |
| JP | 2009-098023 A | 5/2009 | |
| JP | 2013-067343 A | 4/2013 | |

(Continued)

OTHER PUBLICATIONS

International Search Report (Form PCT/ISA/210) dated Jul. 2, 2019, in International Application No. PCT/JP2019/014889. (4 pages).

(Continued)

*Primary Examiner* — Charles T Shedrick
(74) *Attorney, Agent, or Firm* — Buchanan Ingersoll & Rooney PC (57) ABSTRACT

A two-dimensional conversion unit converts point cloud data D1 acquired by a three-dimensional sensor into two-dimensional data with the distance as the pixel value. A convolutional neural network receives the image data as its input, and judges the position of and the category of an object included in the point cloud data.

8 Claims, 11 Drawing Sheets

(56) References Cited

FOREIGN PATENT DOCUMENTS

| JP | 2017-056935 A | 3/2017 | | |
|---|---|---|---|---|
| JP | 2017-138660 A | 8/2017 | | |
| WO | WO-2017067764 A1 * | 4/2017 | ........... | H05B 47/155 |

OTHER PUBLICATIONS

International Preliminary Report on Patentability (Form PCT/IB/373) and the Written Opinion of the International Searching Authority (Form PCT/ISA/237) dated Oct. 6, 2020, in International Application No. PCT/JP2019/014889. (12 pages).

Extended European Search Report dated Apr. 16, 2021, issued by the European Patent Office in corresponding European Application No. 19781388.4. (8 pages).

Wu et al., "Squeezeseg: Convolutional Neural Nets with Recurrent CRF for Real-Time Road-Object Segmentation from 3D Lidar Point Cloud", arxiv.org, Cornell University Library, 201 Olin Library Cornell University Ithaca, NY 14853, Oct. 20, 2017, XP080830243. (7 pages).

* cited by examiner

FIG. 2B $P_1 = (x_1, y_1, z_1)$
$P_2 = (x_2, y_2, z_2)$
$\vdots$
$P_n = (x_n, y_n, z_n)$

PROCESSING DEVICE FOR OBJECT IDENTIFICATION

BACKGROUND

1. Technical Field

The present invention relates to an object identification system.

2. Description of the Related Art

Candidates of vehicle sensors include Light Detection and Ranging, Laser Imaging Detection and Ranging (LiDAR), cameras, millimeter-wave radar, ultrasonic sonar, and so forth. In particular, LiDAR has advantages as compared with other sensors. Examples of such advantages include: (i) an advantage of being capable of recognizing an object based on point cloud data; (ii) an advantage in employing active sensing, which is capable of providing high-precision detection even in bad weather conditions; (iii) an advantage of providing wide-range measurement; etc. Accordingly, LiDAR is anticipated to become mainstream in vehicle sensing systems.

As an object detection method, a method is conceivable in which features are defined for each object category (kind), and the position and the category of a given object are judged by pattern matching. However, with such a method, it is difficult to design such suitable features for each category.

SUMMARY

The present disclosure has been made in view of such a situation.

One aspect of the present disclosure relates to an object identification method or an object identification system. With such a method or system, point cloud data acquired by a three-dimensional sensor is converted into two-dimensional image data with the distance as the pixel value. Subsequently, the image data thus converted is input to a classifier such as a convolutional neural network or the like, so as to judge the position and the category of an object included in the point cloud data.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OUTLINE OF THE EMBODIMENTS

An outline of several example embodiments of the disclosure follows. This outline is provided for the convenience of the reader to provide a basic understanding of such embodiments and does not wholly define the breadth of the disclosure. This outline is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

One embodiment disclosed in the present specification relates to a processing device. The processing device includes: a two-dimensional conversion unit structured to convert point cloud data acquired by a three-dimensional sensor into two-dimensional image data with a distance as a pixel value; and a classifier structured to receive the image data as an input thereof, and to judge the position and the category of an object included in the point cloud data.

With this embodiment, the three-dimensional data configured in the form of point cloud data, which is not intended to be processed by a classifier according to a conventional technique, can be handled as two-dimensional image data. This allows such three-dimensional data to be processed by a classifier that has a proven track record in image processing. In addition, in a case of employing such a classifier, such an arrangement eliminates the need to design features.

Also, the two-dimensional conversion unit may convert each coordinate point in a Euclidean coordinate system included in the point cloud data into a polar coordinate system $(r, \theta, \phi)$, and further converts the polar coordinate point data into two-dimensional image data with $(\theta, \phi)$ as a pixel position and with a distance r as a pixel value.

Also, the processing device may be structured to divide the image data into multiple regions, and to rearrange the regions thus divided, so as to change an aspect ratio. In a case in which the original image data has an aspect ratio that is not suitable for the input of the classifier, by converting the aspect ratio, this arrangement provides improved calculation efficiency.

Embodiment

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

Figure 1:
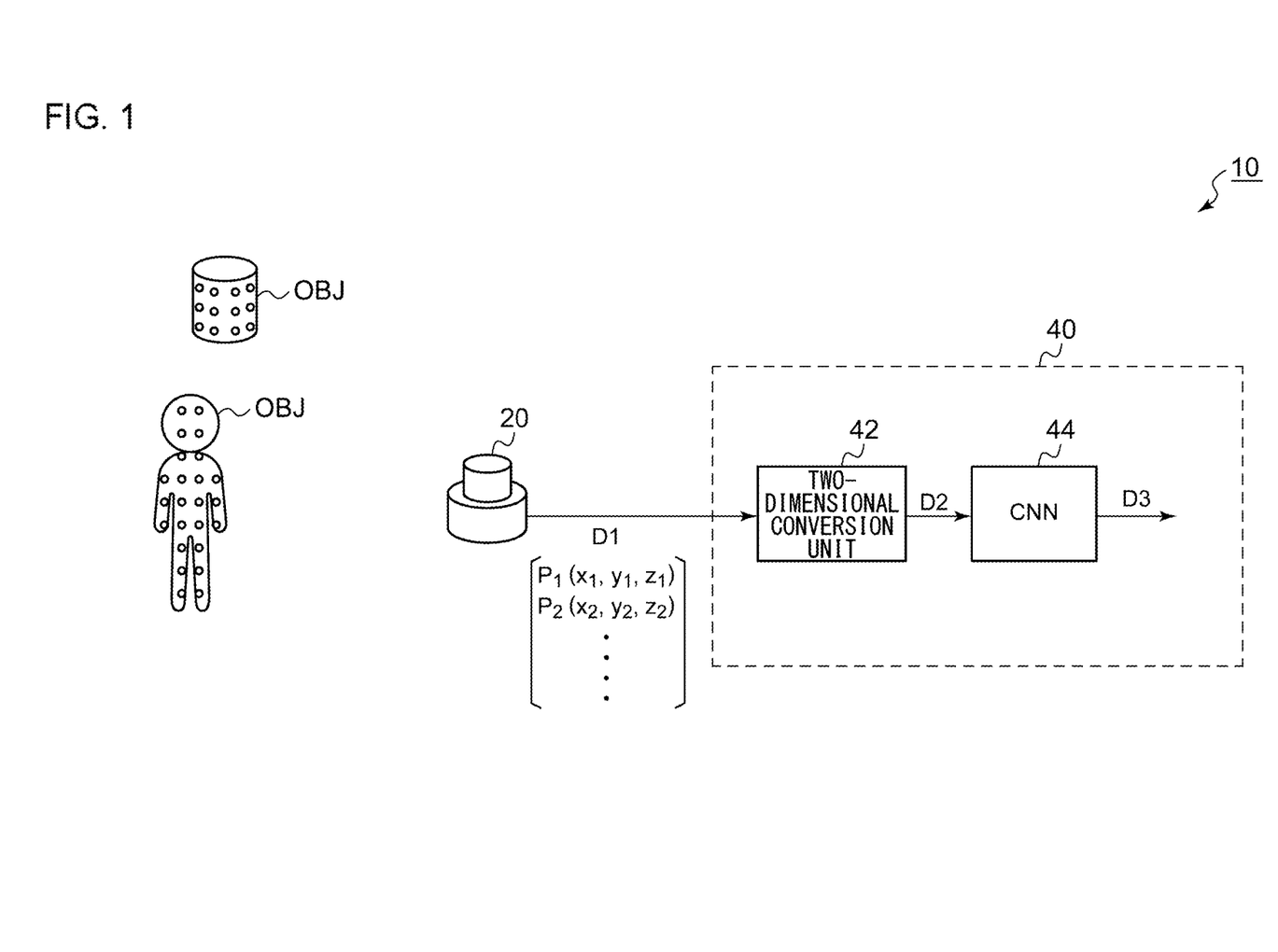
FIG. 1 is a diagram showing an object identification system according to one embodiment.

FIG. 1 is a diagram showing an object identification system 10 according to one embodiment. The object identification system 10 includes a three-dimensional sensor 20 and a processing device 40. The three-dimensional sensor 20 is configured as a LiDAR, Time-Of-Flight (TOF) camera, stereo camera, or the like. The three-dimensional sensor 20 generates point cloud data D1 that represents a set (point cloud) of points p that form the surface of an object OBJ positioned around the three-dimensional sensor 20.

Figure 2A:
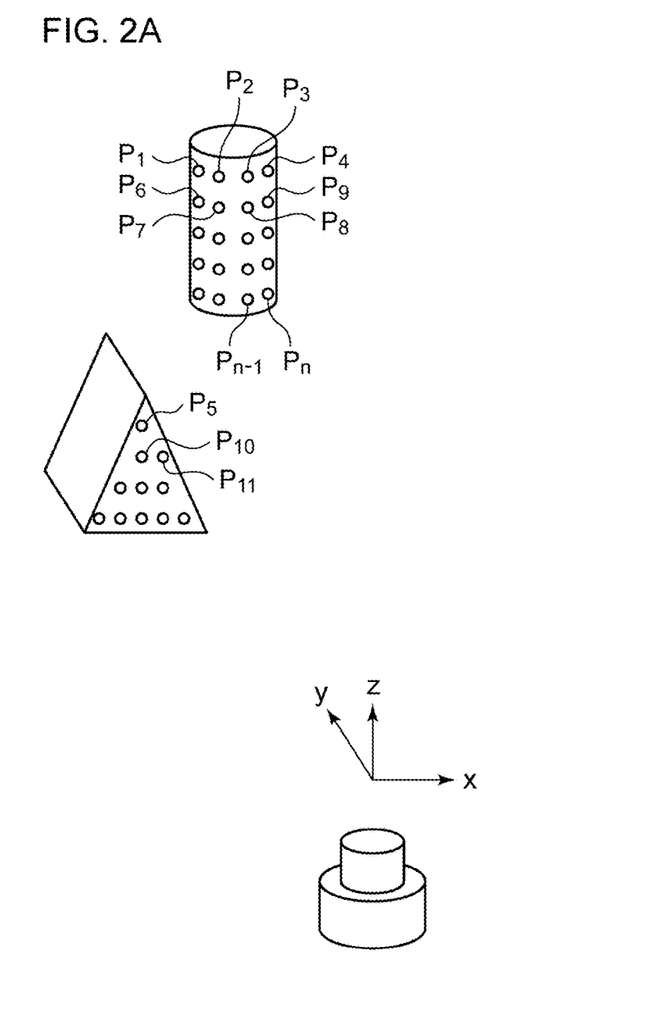
FIGS. 2A and 2B are diagrams for explaining point cloud data generated by a three-dimensional sensor.
Figure 2B:
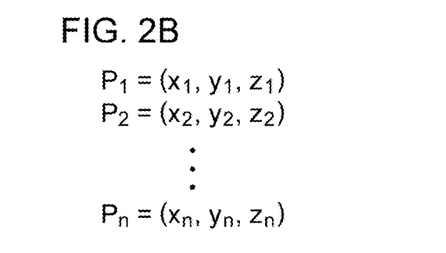

FIGS. 2A and 2B are diagrams for explaining the point cloud data D1 generated by the three-dimensional sensor 20. FIG. 2A is a perspective view showing the relation between the object and the point cloud. FIG. 2B shows a data structure of the point cloud data that represents the point cloud. As shown in FIG. 2A, the point cloud is configured as a set of multiple n points p1, p2, ..., pn. The point cloud data includes three-dimensional data that indicates the position defined in a Euclidean coordinate system for each of the multiple points p1, p2, ..., pn. Specifically, the coordinate of the i-th point pi (i=1, 2, ..., n) is represented by (xi, yi, zi). It should be noted that various kinds of methods are known for defining the point number i, which have been proposed by various manufacturers for various kinds of three-dimensional sensors 20. Also, the point number may be defined in a two-dimensional manner.

Returning to FIG. 1, the processing device 40 judges the position and the category (kind, class) of the object OBJ based on the point cloud data D1. For example, examples of the category of the object include a pedestrian, bicycle, automobile, pole, and the like. Regarding a pedestrian, a pedestrian as viewed from the front, a pedestrian as viewed from the rear, and a pedestrian as viewed from the side may be defined as the same category of object. The same can be said of an automobile and bicycle. In the present embodiment, this definition is employed.

The processing device 40 is configured as a combination of a processor (hardware component) such as a Central Processing Unit (CPU), Graphics Processing Unit (GPU), microcontroller, or the like, and a software program to be executed by the processor (hardware component). Also, the processing device 40 may be configured as a combination of multiple processors.

The processing device 40 includes a two-dimensional conversion unit 42 and a convolutional neural network 44. The two-dimensional conversion unit 42 and the convolutional neural network 44 are not necessarily configured as independent hardware components. Also, the two-dimensional conversion unit 42 and the convolutional neural network 44 may represent functions supported by execution of a software program by a hardware component such as a CPU or the like.

The two-dimensional conversion unit 42 converts the point cloud data D1 acquired by the three-dimensional sensor 20 into two-dimensional image data D2 having pixel values each indicating the corresponding distance r. The distance r may be represented in 8-bit 256 shades, for example.

The convolutional neural network 44 is configured as a classifier configured to receive the image data D2 as its input, to judge the position and the category of an object OBJ included in the point cloud data D1, and to output final data D3 that indicates the position and the likelihood (belonging probability) for each category. The convolutional neural network 44 is provided based on a prediction model generated by machine learning.

The convolutional neural network 44 may be configured using known techniques that are widely employed in image recognition. Accordingly, detailed description thereof will be omitted.

Figure 3A:
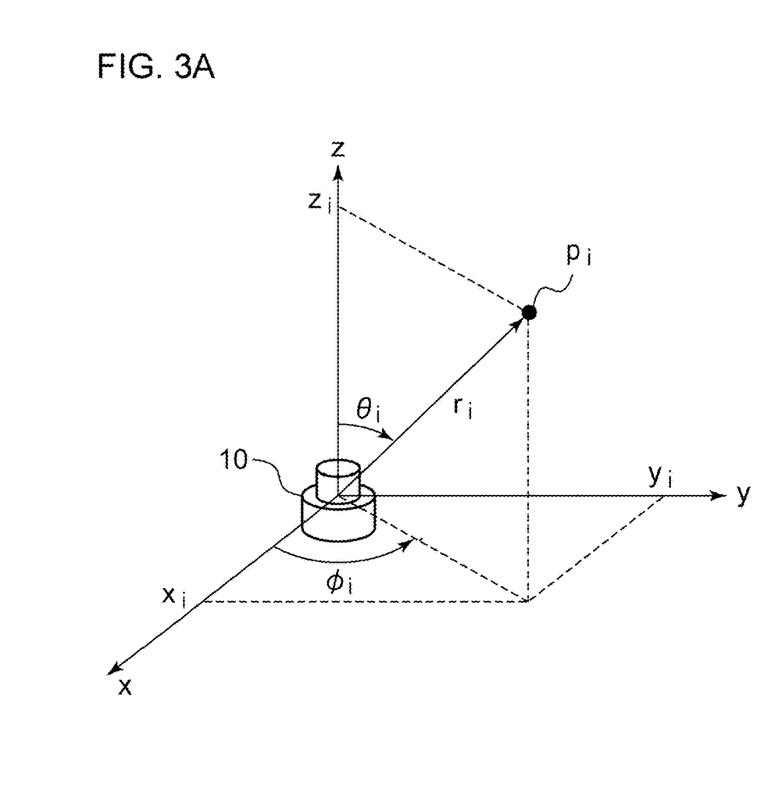
FIGS. 3A and 3B are diagrams for explaining the relation between the point cloud data and image data.
Figure 3B:
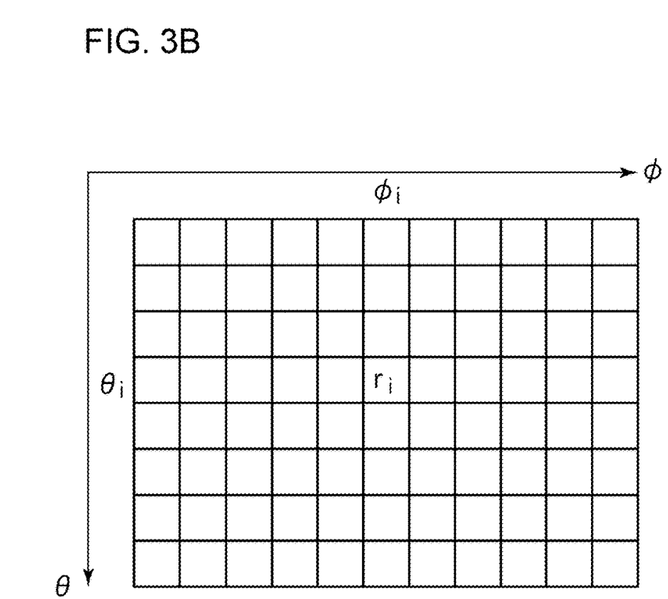

FIGS. 3A and 3B are diagrams for explaining the relation between point cloud data D1 and image data D2. As shown in FIG. 3A, the coordinate point of each point pi included in the point cloud data D1 is represented in the Euclidean coordinate system, i.e., (xi, yi, zi). The two-dimensional conversion unit 42 converts the Euclidean coordinate system (xi, yi, zi) into a polar coordinate system (ri, θi, φi). Here, "r" represents the radial component, "θ" represents the polar angle component (zenith angle component), and "φ" represents the azimuthal angle component (declination angle component). Furthermore, the data thus converted into the polar coordinate system is converted into the two-dimensional image data D2 with (θ, φ) as the pixel position and with the distance r as the pixel value. FIG. 2B shows a mapping example of the point pi.

Figure 4:
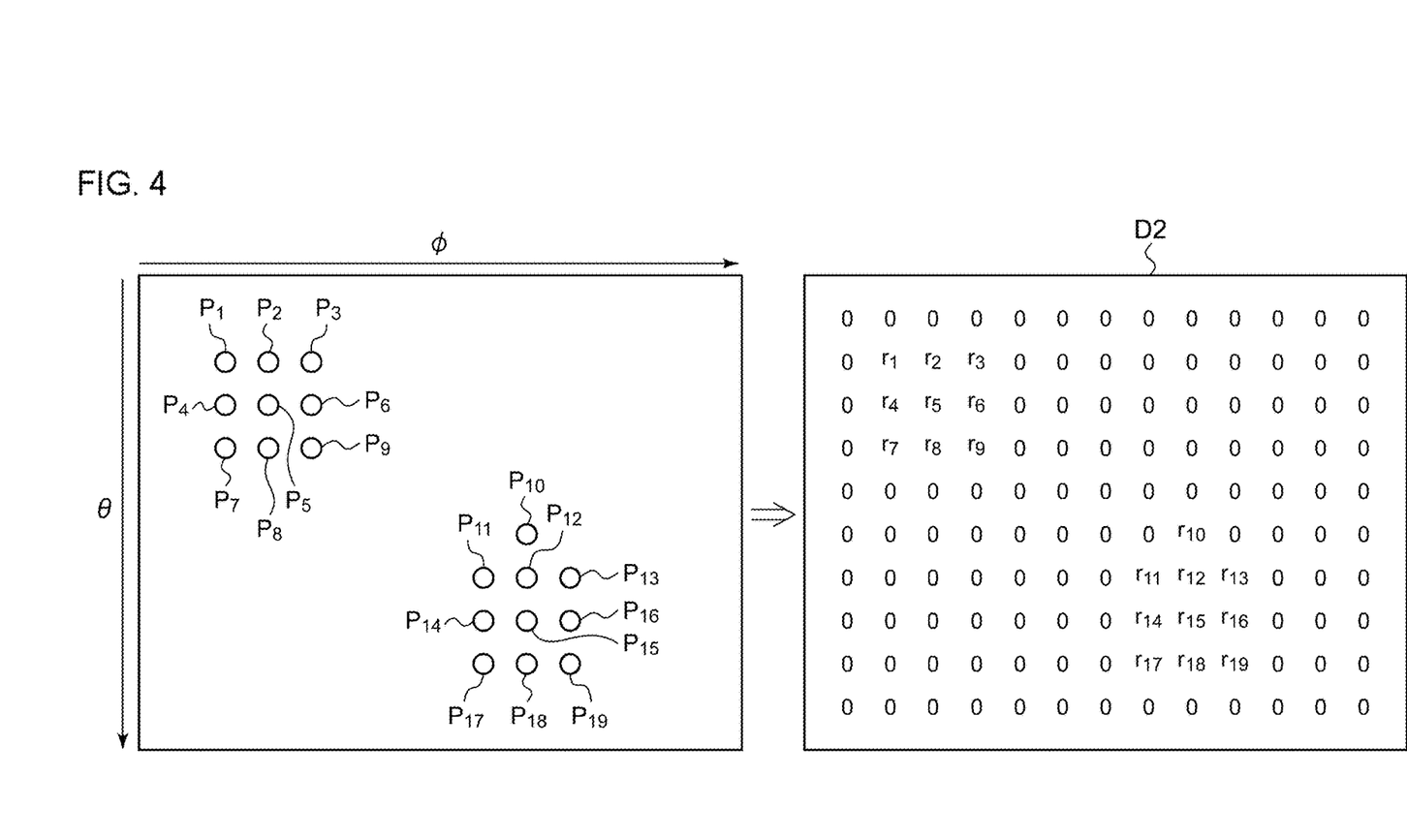
FIG. 4 is a diagram for explaining mapping from the point cloud data to the image data.

FIG. 4 is a diagram for explaining the mapping from the point cloud data to the image data. All the points (p1 through p19, in this example) included in the point cloud data are mapped to a two-dimensional data structure, thereby generating the image data D2. In a case in which a given pixel has no point p to be mapped, the maximum value (or 0 or a negative value) may be mapped as its pixel value.

The above is the configuration of the object identification system 10. Next, description will be made regarding the results obtained by investigating the object recognition supported by the processing device 40.

Such investigation was made using distance data generated using 3D computer graphics instead of using the point cloud data D1 generated by the three-dimensional sensor 20. Five categories, i.e., "automobile", "truck", "pedestrian", "motorcycle", and "bicycle" were investigated. The distance data was configured as two-dimensional 300×300-pixel data, which corresponds to the image data D2 described above. The pixel value of the distance data represents the distance.

Figure 5A:
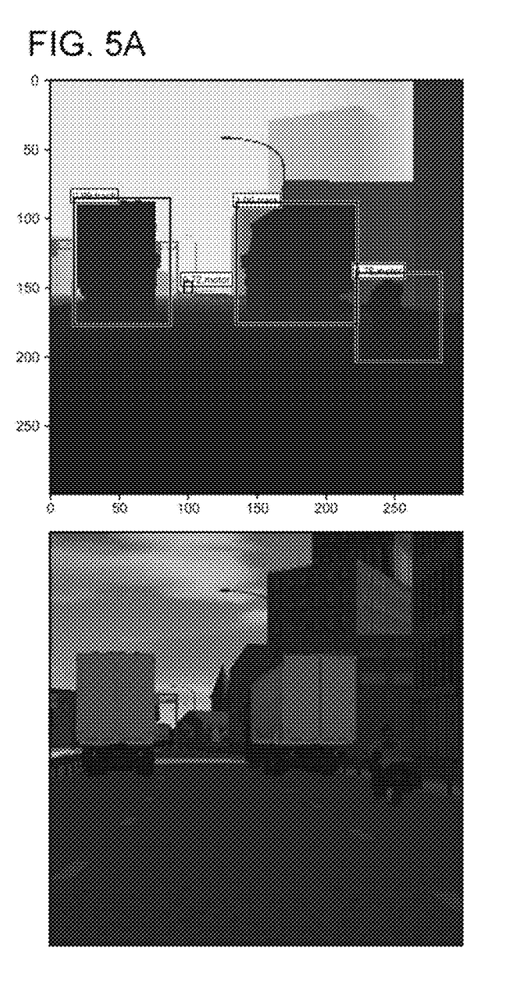
FIGS. 5A and 5B are diagrams showing two typical scenes.
Figure 5B:
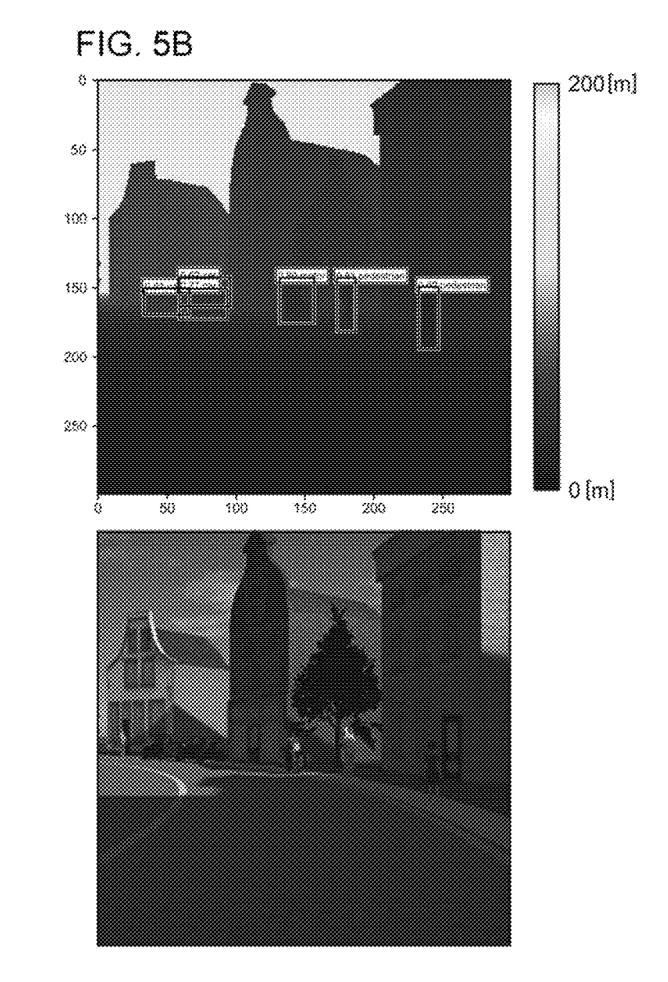

FIGS. 5A and 5B are diagrams showing two typical scenes. FIG. 5A shows a scene on a highway, which includes two trucks and two motorcycles each positioned in the forward direction. FIG. 5B shows a scene of an urban area including two pedestrians, three automobiles, and a single motorcycle each positioned in the forward direction. The upper side of each drawing shows the distance data, and the lower side of each drawing shows a camera image projected onto a two-dimensional plane.

As the convolutional neural network 44, a Single Shot MultiBox Detector (SSD) is employed, which has a strong advantage in detecting overlapping objects and is capable of detecting a small object. The SSD is configured as a neural network including multiple convolutional layers. With such an arrangement, six convolutional layers having different sizes each output the position of an object and the likelihood of each category. This arrangement provides multiple outputs acquired by the six layers. Furthermore, a so-called "Non-Maximum Suppression" layer configured as an output layer integrates the estimation results having a large area overlapping with the object area, thereby acquiring a final output.

In order to support the learning for the convolutional neural network 44, teacher data was acquired using the commercially available simulation software PreScan provided as an advanced driving assist system (ADAS) development and support tool. The teacher data was configured as a set of distance data having a two-dimensional data structure and annotation data representing the position and the category of an object that corresponds to the distance data. It should be noted that, as the distance data having such a two-dimensional data structure, the same data as that acquired by the three-dimensional sensor 20 employed in the object identification system 10 is preferably used. However, in this investigation, a virtual depth camera was employed. Finally, 713 items of teacher data were generated.

Figure 6:
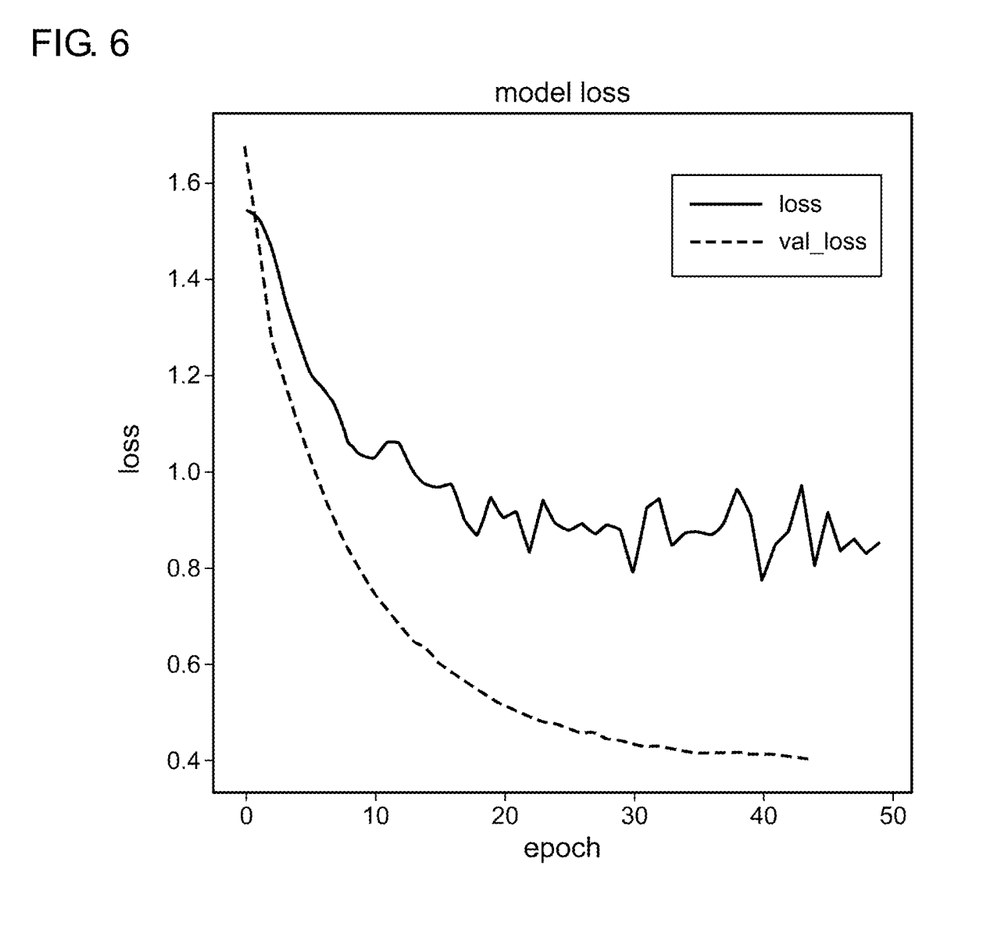
FIG. 6 is a diagram showing the transition in the loss with respect to learning.
Figure 7A:
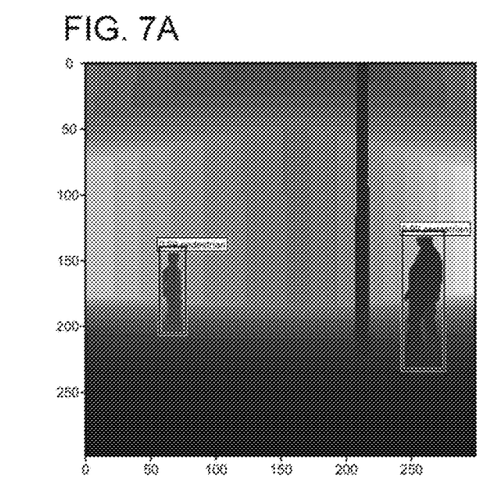
FIGS. 7A through 7E are diagrams showing several validation results.
Figure 7B:
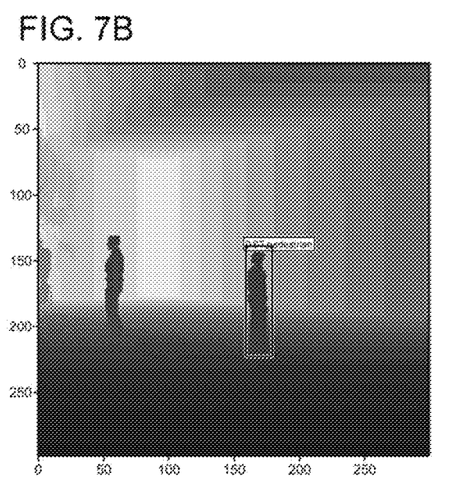
Figure 7C:
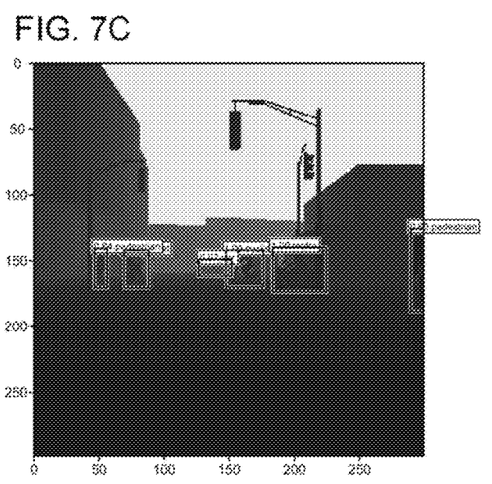
Figure 7D:
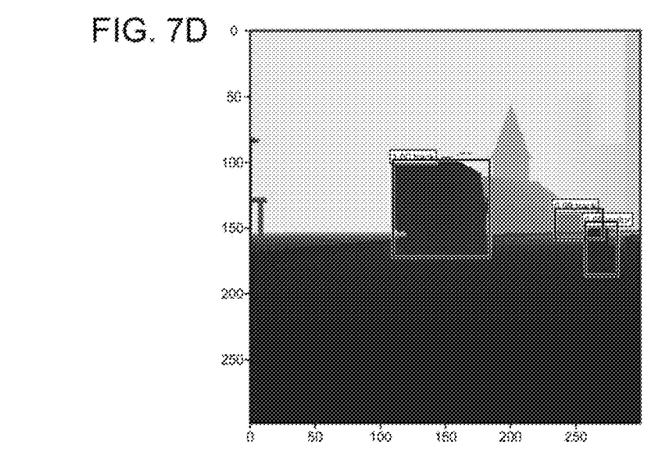
Figure 7E:
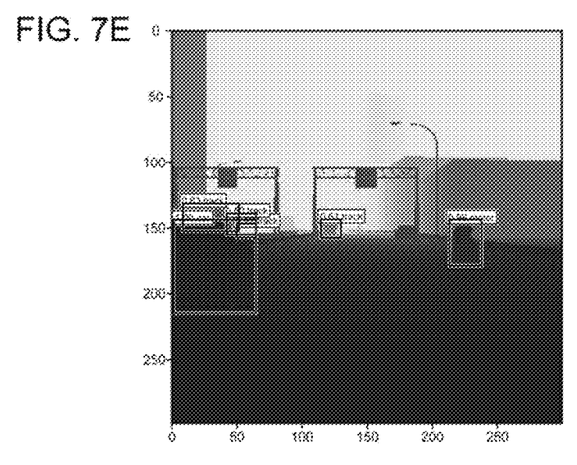

From among the 713 items of teacher data, 80% of the teacher data, i.e., 571 items of teacher data, were used for the learning. The other items of the teacher data were used for validation. The learning was performed with the number of learning cycles as 50 epochs and with a batch size of 4. FIG. 6 is a diagram showing the transition in the loss with respect to the learning.

FIGS. 7A through 7E are diagrams showing several validation results. Each bounding box indicates the position of a detected object. In addition, the category and the likelihood thereof are also indicated. The results indicate that there were several objects that could not be detected. However, it can be understood that the pedestrians, trucks, automobiles, and motorcycles, were detected correctly.

In the object identification system 10, a convolutional neural network configured to handle image data is employed to handle two-dimensional distance data. This arrangement is capable of position detection and category identification. Furthermore, the object identification system 10 has an advantage of requiring no clustering processing in which the point cloud data is divided for each object.

Figure 8:
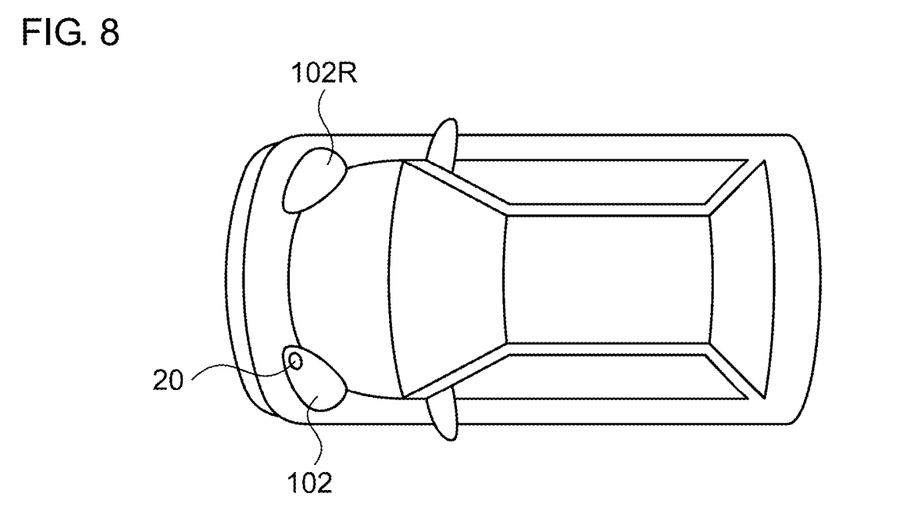
FIG. 8 is a block diagram showing an automobile including the object identification system.

FIG. 8 is a block diagram showing an automobile including the object identification system 10. An automobile 100 includes headlamps 102L and 102R. From among the components of the object identification system 10, at least the three-dimensional sensor 20 is built into at least one of the headlamps 102L and 102R. Each headlamp 102 is positioned at a frontmost end of the vehicle body, which is most advantageous as a position where the three-dimensional sensor 20 is to be installed for detecting an object in the vicinity. The processing unit 40 may be built into the headlamp 102. Also, the processing unit 40 may be provided to the vehicle side. For example, from among the functions of the processing device 40, the function of generating the intermediate data may be provided by an internal component of the headlamp 102. Also, the function of generating the final data may be provided by another component on the vehicle side.

Figure 9:
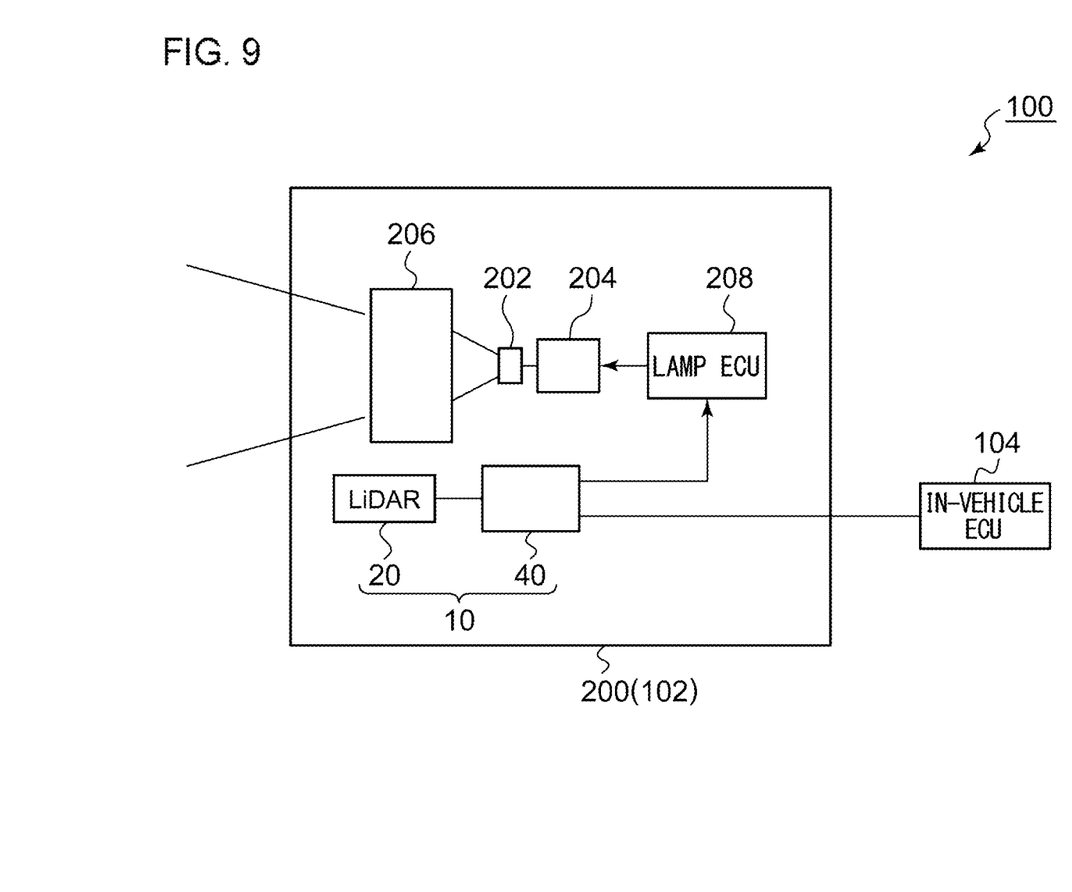
FIG. 9 is a block diagram showing an automotive lamp including the object identification system.

FIG. 9 is a block diagram showing an automotive lamp 200 including the object identification system 10. The automotive lamp 200 includes a light source 202, a lighting circuit 204, and an optical system 206. Furthermore, the automotive lamp 200 is provided with the three-dimensional sensor 20 and the processing device 40. The information with respect to the object OBJ detected by the processing device 40 is transmitted to the in-vehicle ECU 104. The in-vehicle ECU may support autonomous driving based on the information thus transmitted.

Also, the information with respect to the object OBJ detected by the processing device 40 may be used to support the light distribution control operation of the automotive lamp 200. Specifically, the lamp ECU 208 generates a suitable light distribution pattern based on the information with respect to the kind of the object OBJ and the position thereof thus generated by the processing device 40. The lighting circuit 204 and the optical system 206 operate so as to provide the light distribution pattern generated by the lamp ECU 208.

Description has been made above regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Modification 1

Description has been made in the embodiment regarding an arrangement in which three-dimensional point cloud data is converted into a polar coordinate system $(r, \theta, \phi)$, and is further converted into two-dimensional image data with $(\theta, \phi)$ as the pixel position and with the distance r as the pixel value. However, the present invention is not restricted to such an arrangement. Also, various modifications may be made with respect to the conversion to the image data D2.

For example, each point included in the three-dimensional point cloud data may be converted from the Euclidean coordinate system into a cylindrical coordinate system $(r, z, \phi)$, and may be further converted into the image data D2 with $(z, \phi)$ as the pixel position and with the distance r as the pixel value.

Also, each point included in the three-dimensional point cloud data may be projected onto a two-dimensional plane, and may be further converted into the image data D2 with the distance r as the pixel value. As the projection method, the perspective projection method or the parallel projection method may be employed.

Modification 2

The object may be defined as a different category for each orientation as viewed from the user's vehicle. That is to say, the same object may be identified as a different category according to the orientation thereof, e.g., whether or not the object is positioned with a face-to-face orientation with respect to the user's vehicle. This arrangement is advantageous in estimating the object OBJ moving direction.

Modification 3

The processing device 40 may be configured of only a hardware component using an FPGA, a dedicated Application Specific Integrated Circuit (ASIC), or the like.

Modification 4

Description has been made in the embodiment regarding the in-vehicle object identification system 10. However, the present invention is not restricted to such an application. For example, the object identification system 10 may be fixedly installed on transportation infrastructure such as a traffic light, traffic sign, or the like. That is to say, the present invention is applicable to a fixed-point observation application.

Modification 5

Figure 10:
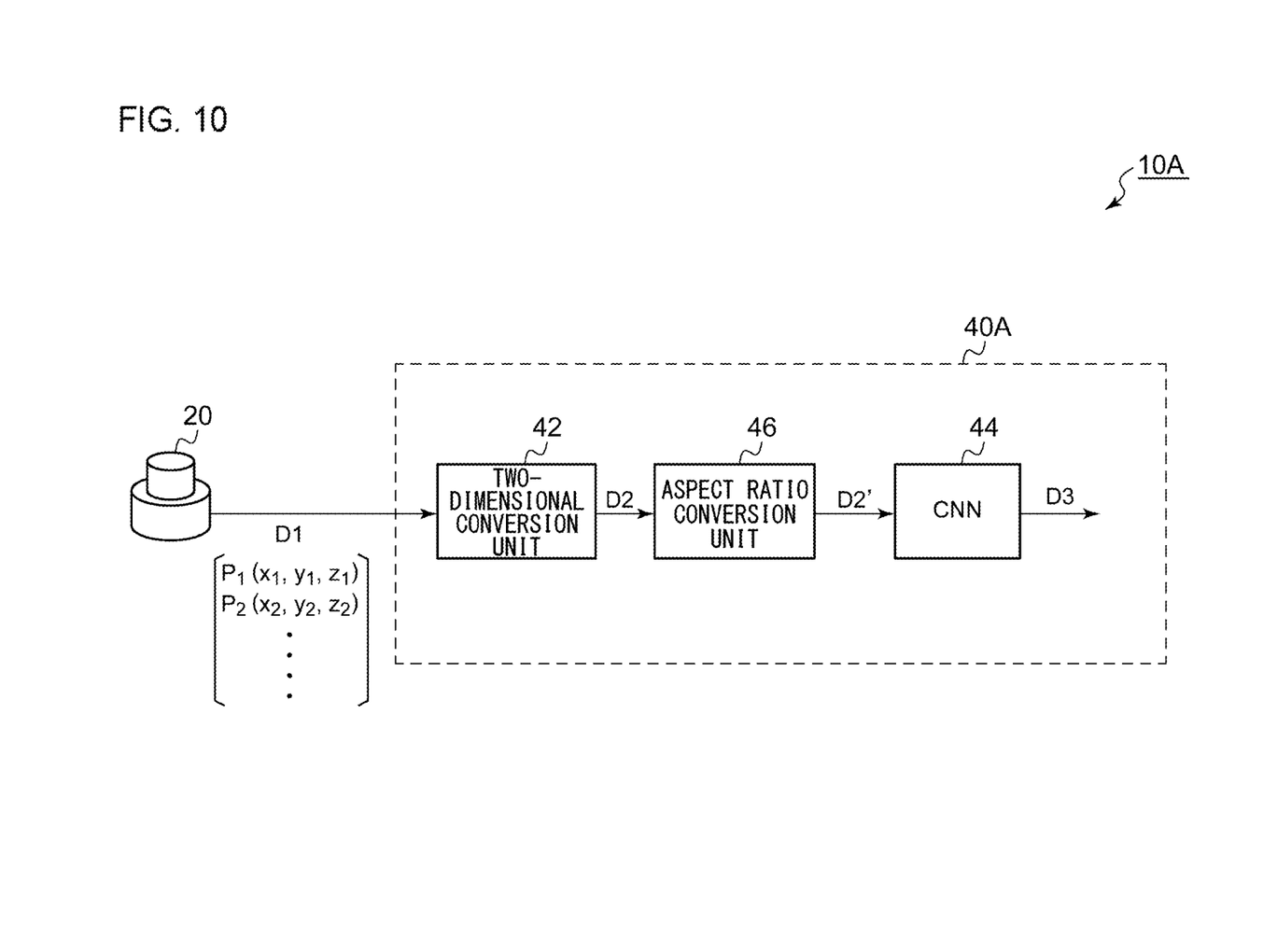
FIG. 10 is a diagram showing an object identification system according to a modification 5.

FIG. 10 is a diagram showing an object identification system 10A according to a modification 5. In many cases, the convolutional neural networks developed for object detection using an image recognition technique support resolutions and aspect ratios of typical images. The assumed aspect ratios are 1:1 or 4:3, or on the order of 16:9. In a case in which a low-cost three-dimensional sensor is employed as the three-dimensional sensor 20, in some cases, the three-dimensional sensor 20 supports image acquisition with extremely poor resolution in the elevation/depression angle direction (height direction) as compared with the resolution in the horizontal direction. For example, the Quanergy M8, which is a LiDAR sold by Quanergy Systems, Inc. (USA), supports a resolution of 10,400 in the horizontal direction in 360-degree scanning. However, it supports only a very poor resolution of 8 in the elevation/depression angle direction, leading to an extremely large aspect ratio (10,400:8).

In order to solve such a problem, a processing device 40A shown in FIG. 10 includes an aspect ratio conversion unit 46 that converts the aspect ratio of the image data D2' acquired by the two-dimensional conversion unit 42. The convolutional neural network 44 receives, as its input, image data D2 with a converted aspect ratio.

Figure 11:
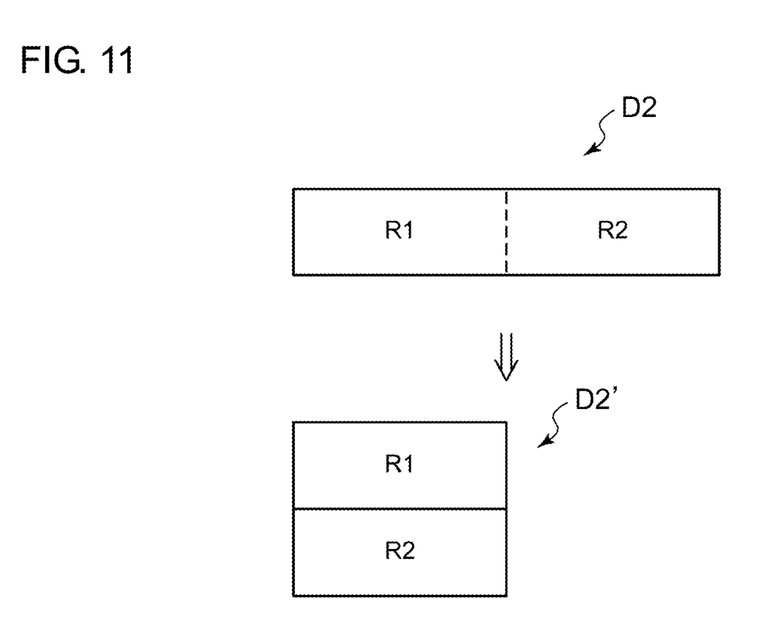
FIG. 11 is a diagram for explaining an example of aspect ratio conversion processing supported by an aspect ratio conversion unit.

FIG. 11 is a diagram for explaining an example of the aspect ratio conversion processing supported by the aspect ratio conversion unit 46. The original image data D2 may be divided into multiple regions R1 and R2, and the multiple regions thus divided may be rearranged so as to change the aspect ratio.

In a case in which the original image data D2 has an aspect ratio that is not suitable for the input of the convolutional neural network 44, the aspect ratio may be converted. This arrangement provides improved calculation efficiency.

Modification 6

Examples of algorithms that can be employed in the classifier include You Only Look Once (YOLO), Single Shot MultiBox Detector (SSD), Region-based Convolutional Neural Network (R-CNN), Spatial Pyramid Pooling (SPP-net), Faster R-CNN, Deconvolution-SSD (DSSD), Mask R-CNN, etc. Also, other algorithms that will be developed in the future may be employed. Also, linear SVM or the like may be employed.

Description has been made regarding the present invention with reference to the embodiments using specific terms. However, the above-described embodiments show only an aspect of the mechanisms and applications of the present invention. Rather, various modifications and various changes in the layout can be made without departing from the spirit and scope of the present invention defined in appended claims.

What is claimed is:

1. A processing device comprising:
   a two-dimensional conversion unit structured to convert point cloud data acquired by a three-dimensional sensor into two-dimensional image data with a distance as a pixel value; and
   a classifier structured to receive the image data as an input thereof, and to judge a position and a category of an object included in the point cloud data; and
   wherein the processing device is structured to divide the image data into a plurality of regions, and to rearrange the regions thus divided, so as to change an aspect ratio.

2. The processing device according to claim 1, wherein the two-dimensional conversion unit is structured to convert each coordinate point in a Euclidean coordinate system included in the point cloud data into a polar coordinate system $(r, \theta, \phi)$, and to convert the polar coordinate point data into two-dimensional image data with $(\theta, \phi)$ as a pixel position and with a distance $r$ as a pixel value.

3. An object identification system comprising:
   a three-dimensional sensor; and
   the processing device according to claim 1.

4. An automobile comprising the object identification system according to claim 3.

5. The automobile according to claim 4, wherein the three-dimensional sensor is built into a headlamp.

6. An automotive lamp provided with the object identification system according to claim 3.

7. An object identification method comprising:
   generating point cloud data by a three-dimensional sensor;
   converting the point cloud data into two-dimensional image data with a distance as a pixel value;
   judging a position and a category of an object included in the point cloud data by inputting the image data to a classifier; and
   changing an aspect ratio by dividing the image data into a plurality of regions, and by rearranging the regions thus divided.

8. The object identification method according to claim 7, wherein the converting comprises:
   converting the point cloud data, which is a set of three-dimensional data in a Euclidean coordinate system, into a polar coordinate system $(r, \theta, \phi)$; and
   converting the polar coordinate point data into two-dimensional image data with $(\theta, \phi)$ as a pixel position and with a distance $r$ as a pixel value.

* * * * *